(12) United States Patent
Ou et al.

(10) Patent No.: US 12,124,888 B2
(45) Date of Patent: *Oct. 22, 2024

(54) AUTOSCALING NODES OF A STATEFUL APPLICATION BASED ON ROLE-BASED AUTOSCALING POLICIES

(71) Applicant: Hewlett Packard Enterprise Development LP, Spring, TX (US)

(72) Inventors: Xiongbing Ou, Santa Clara, CA (US); Lakshminarayanan Gunaseelan, Santa Clara, CA (US); Joel Baxter, Santa Clara, CA (US); Swami Viswanathan, Morgan Hil, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/342,998

(22) Filed: Jun. 28, 2023

(65) Prior Publication Data

US 2023/0342220 A1 Oct. 26, 2023

Related U.S. Application Data

(63) Continuation of application No. 16/800,024, filed on Feb. 25, 2020, now Pat. No. 11,698,820.

(51) Int. Cl.
*G06F 9/50* (2006.01)

(52) U.S. Cl.
CPC ...... *G06F 9/5077* (2013.01); *G06F 2209/505* (2013.01)

(58) Field of Classification Search
None
See application file for complete search history.

(56) References Cited

U.S. PATENT DOCUMENTS 9,692,707 B2   6/2017 Tang et al.
10,333,901 B1  6/2019 Bauman et al.
(Continued)

OTHER PUBLICATIONS

Amazon Web Services, Inc., "Using Automatic Scaling in Amazon EMR", AWS Documentation, available online at <https://web.archive.org/web/20190325153637/https://docs.aws.amazon.com/emr/latest/ManagementGuide/emr-automatic-scaling.html>, Mar. 25, 2019, 12 pages.

(Continued)

*Primary Examiner* — Meng Ai T An
*Assistant Examiner* — Zujia Xu
(74) *Attorney, Agent, or Firm* — Trop, Pruner & Hu, P.C.

(57) ABSTRACT

Example implementations relate to a role-based autoscaling approach for scaling of nodes of a stateful application in a large scale virtual data processing (LSVDP) environment. Information is received regarding a role performed by the nodes of a virtual cluster of an LSVDP environment on which a stateful application is or will be deployed. Role-based autoscaling policies are maintained defining conditions under which the roles are to be scaled. A policy for a first role upon which a second role is dependent specifies a condition for scaling out the first role by a first step and a second step by which the second role is to be scaled out in tandem. When load information for the first role meets the condition, nodes in the virtual cluster that perform the first role are increased by the first step and nodes that perform the second role are increased by the second step.

19 Claims, 6 Drawing Sheets

(56) References Cited

U.S. PATENT DOCUMENTS

| | | | |
|---|---|---|---|
| 10,409,642 | B1 | 9/2019 | Tang et al. |
| 10,637,738 | B1* | 4/2020 | McDowell |
| 2016/0217010 | A1* | 7/2016 | Krishnan ............ H04L 67/1008 |
| 2016/0323377 | A1 | 11/2016 | Einkauf et al. |
| 2018/0316751 | A1 | 11/2018 | Shen et al. |
| 2019/0220266 | A1* | 7/2019 | Doshi .................... G06F 9/455 |

OTHER PUBLICATIONS

Chockalingam et al., Introducing Databricks Optimized Autoscaling on Apache Spark™, Databricks Company Blog, available online at <https://databricks.com/blog/2018/05/02/introducing-databricks-optimized-auto-scaling.html>, May 2, 2018, 6 pages.

HPE, Inc., "EPC 4.0 and ML Ops User-Administrator Guide," User Guide, Sep. 11, 2019, pp. 1-769.

Owen et al., "Transparent Autoscaling of Instance Storage", Databricks Company Blog,, available online at <https://databricks.com/blog/2017/12/01/transparent-autoscaling-of-instance-storage.html>, Dec. 1, 2017, 6 pages.

Scheller, Brandon, "Best practices for resizing and automatic scaling in Amazon EMR", AWS Big Data Blog, available online at <https://aws.amazon.com/blogs/big-data/best-practices-for-resizing-and-automatic-scaling-in-amazon-emr/>, Jun. 21, 2018, 6 pages.

* cited by examiner

```
[...]                                         530    510
"policies": [
  {
    "role_id": "server",
    "constraints": {
      "min_node_count": 1,
      "max_node_count": 20
    },                                         511
    "rules": [
      {
        "name": "scale-out-1",
        "description": "higher cpu or memory usage",
        "evaluation_period": 180,
        "action_interval": 300, "if_any": [                            512
          {
            "metric_field": "cpu",
            "greater_than": 100,
            "unit": "percent"
          },
          {
            "metric_field": "rss_pct",
            "greater_than": 50,
            "unit": "percent"
          }
        ], "then": {

"action": "expand",                  513
          "step": 1,

"tandem": [                          514
            {"role_id": "gateway",
             "action": "expand",
             "step": 1,
             "max_node_count": 5,
             "delay": 0
            }
          ]
        }
[...]
```

[...]
                                              521
  {
    "name": "scale-in-1",
    "description": "both low cpu and memory usage",
    "evaluation_period": 180,
    "action_interval": 300, "if_all": [                               522
      {
        "metric_field": "cpu",
        "less_than": 50,
        "unit": "percent"
      },
      {
        "metric_field": "rss_pct",
        "less_than": 20,
        "unit": "percent"
      }
    ], "then": {

"action": "shrink",                     523
      "step": 1,

"tandem": [                             524
        {"role_id": "gateway",
         "action": "shrink",
         "step": 1,
         "min_node_count": 1,
         "delay": 0
        }
      ]
    }
[...]
```

… # AUTOSCALING NODES OF A STATEFUL APPLICATION BASED ON ROLE-BASED AUTOSCALING POLICIES

CROSS-REFERENCE TO RELATED APPLICATIONS

This application is a continuation application of and claims priority to application Ser. No. 16/800,024, filed on Feb. 25, 2020, the contents of which are hereby incorporated by reference in their entireties.

BACKGROUND

In the context of a container orchestration system, inefficiencies arise when resources (e.g., containers) are under or over utilized. Providers of container orchestration systems may implement autoscaling approaches to monitor applications and automatically adjust capacity to maintain steady, predictable performance at the lowest cost.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to a role-based autoscaling approach for providing fine-grained control of scaling of nodes of a stateful application in a large scale virtual data processing (LSVDP) environment. In the following description, numerous specific details are set forth in order to provide a thorough understanding of example embodiments. It will be apparent, however, to one skilled in the art that embodiments described herein may be practiced without some of these specific details.

There are two general types of applications: stateless and stateful. A stateless application (e.g., a web server) does not store data generated from one session for use in a subsequent session. As such, there is no dependency on the local container storage for a stateless workload. In contrast, stateful applications (e.g., artificial intelligence (AI) applications and applications relating to storing and processing big data, including data science, analytics, machine learning (ML), and deep learning (DL)) are services that rely on backing storage, and maintaining state is expected as part of running the service. Apache Hadoop and Apache Spark are non-limiting examples of software frameworks for storing data and running applications on clusters of hosts that are intended to provide massive storage of data and enormous processing power to support concurrent tasks or jobs by distributing data and calculations across different hosts so multiple tasks can be accomplished simultaneously.

For stateful applications that are deployed in distributed computing environments, such as an LSVDP environment (e.g., Hadoop or Spark), each host of the cluster may cooperatively work with the others to implement the function of the application. Each host of the cluster may include multiple nodes (e.g., application containers), each having one role (which may include multiple related services), operating within a virtual cluster. As a result of different tasks being performed by the different roles, the bottleneck for each role may be different. For example, one role might be central processing unit (CPU) intensive, and another role might be memory or Input/Output (I/O) intensive. Additionally, there may be dependencies among the various roles. For example, for each two nodes performing a first role (e.g., data analysis), it may be desirable to have one node performing a second role (e.g., reporting). This creates difficulties for existing autoscaling approaches, which typically perform scaling in or scaling out of nodes independently. Some vendors have attempted to address these issues with application-specific autoscaling approaches bound to particular applications; however, such application-specific autoscaling approaches require in-depth knowledge of the application logic; and furthermore due to their tight coupling with the application logic cannot be used for other applications.

Embodiments described herein seek to improve resource utilization for stateful applications running in an LSVDP environment in an application agnostic manner using role-based autoscaling policies as well as information regarding dependencies among various roles. In one embodiment the autoscaling approach does not require knowledge regarding the specific application logic, and can rely simply on information regarding the utilization of or load on various resources (e.g., CPU, memory, network, disk I/O, and the like) that have been allocated to the respective nodes. In this manner, the autoscaling approach proposed by embodiments described herein is more flexible, decoupled from the underlying application logic and can therefore be generalized for use in connection a broad variety of applications.

As those skilled in the art will appreciate, another complexity associated with LSVDP environments is selecting an appropriate cluster size when creating a virtual cluster for data processing as the size of the data set may not be known upfront and may vary over time. As such, use of embodiments described herein, allows the virtual cluster of an application to be created with minimal cluster size to reduce potential overprovisioning and resource waste. Then, as the load on various roles of the application are observed, the virtual cluster can automatically be expanded based on the role-based autoscaling policies.

As described in further detail below, in one embodiment, a controller of the LSVDP environment maintains a set of role-based autoscaling policies in which each role-based autoscaling policy defines a set of one or more conditions under which a particular role of multiple user-defined roles are to be scaled. A role-based autoscaling policy may also identify one or more dependent roles that are to be scaled in tandem with the role with which the policy is associated. When one or more conditions of a role-based autoscaling policy is triggered for a particular role performed by a node of a virtual cluster, the number of nodes associated with the particular role may be increased/decreased as appropriate within the virtual cluster by a step size defined by the policy; and, in tandem, the number of nodes associated with the one or more dependent roles performed by one or more other node of the virtual cluster may also be increased/decreased within the virtual cluster as appropriate by respective step sizes defined by the policy. In this manner, a user of the LSVDP environment is provided with a fine-grained mechanism to control autoscaling at the level of a role of a node while also maintaining desired proportions of nodes performing various roles.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Reference in the specification to "one embodiment," "an embodiment" or the like means that a particular feature, structure, or characteristic described in connection with the embodiment is included in at least one embodiment of the invention. The appearances of the phrase "in one embodiment," "according to one embodiment" and the like in various places in the specification are not necessarily all referring to the same embodiment.

The phrase "big data" generally refers to extremely large data sets that contain greater variety, arriving in increasing volumes, and with ever-higher velocity. These data sets are so voluminous and/or complex that they cannot be dealt with effectively by traditional data processing software. A non-limiting example of big data might be terabytes (1,024 gigabytes), petabytes (1,024 terabytes) or exabytes (1,024 petabytes) of structured or unstructured data that may consist of billions to trillions of records relating to millions of objects (e.g., people). Furthermore, the records may be from a variety of different sources (e.g., Web, sales, customer contact center, social media, mobile data and so on).

The phrase "large scale virtual data processing (LSVDP) environment" generally refers to a distributed processing framework that facilitates the processing by an application of an extremely large data set by distributing data and calculations across multiple distributed hosts that work together to accomplish the function of the application by performing multiple tasks (portions of the entire job) concurrently. Some non-limiting characteristics of an LSVDP include a reliable shared storage (e.g., a distributed file system, like the Hadoop Distributed File System (HDFS)), an analysis system (e.g., a programming model or pattern within the LSVDP that is used to access, process and/or generate big data sets in the shared storage with a parallel, distributed algorithm on a cluster, like MapReduce), high scalability (e.g., linear scalability), and cost efficiency (e.g., can be based on underlying commodity hardware). An LSVDP environment is typically designed for big data analytics. Non-limiting examples of an LSVDP environment include Apache Hadoop and Apache Spark.

As used herein a "role identifier (ID)" generally refers to a user-defined description, name or identifier associated with a function, responsibility, or task performed by a node within a virtual cluster of an LSVDP environment. In some embodiments, each host of a cluster within a LSVDP environment may include multiple nodes (e.g., application containers), each having a particular role/responsibility in the context of a particular application.

In one embodiment, several related services may be represented by one container, and one role is defined for each type of container. For purposes of illustration, consider a simplified Hadoop cluster that is used mainly for a map/reduce job. In this example, three types of roles may be defined, including a "controller" role, a "worker" role, and a "manager" role. In this example, the controller role may include a HDFS namenode and a Yet Another Resource Negotiator (YARN) resource manager to manage the distributed resources; the worker role may include an HDFS datanode, and a YARN node manager to store the data and execute the map/reduce tasks; and the manager role may include an Ambari or Cloudera Manager to manage the whole virtual cluster. In this non-limiting example, if the Hadoop cluster also needs to handle database workload, then it may also include a "database" role that includes an Hbase HRegionServer etc.

The previous example is intended to illustrate that a "role" can be thought of as a tag for a set of grouped services. Even for the same application, the customer/user can name different roles as they want to the same service group. As those skilled in the art will appreciate, the services that may be grouped together as one role is application dependent. In embodiments described herein, the autoscaling policy operates at a higher-level in relation to containers and the roles that they represent. As such, the autoscaling policy need not know which or how many services are included in that role and is therefore decoupled from such application dependencies.

The phrase "stateful application" generally refers to an application that persists state information or data to a data store. In the context of the present disclosure, a specific, non-limiting example of stateful application includes an application that performs big data analytics.

Figure 1:
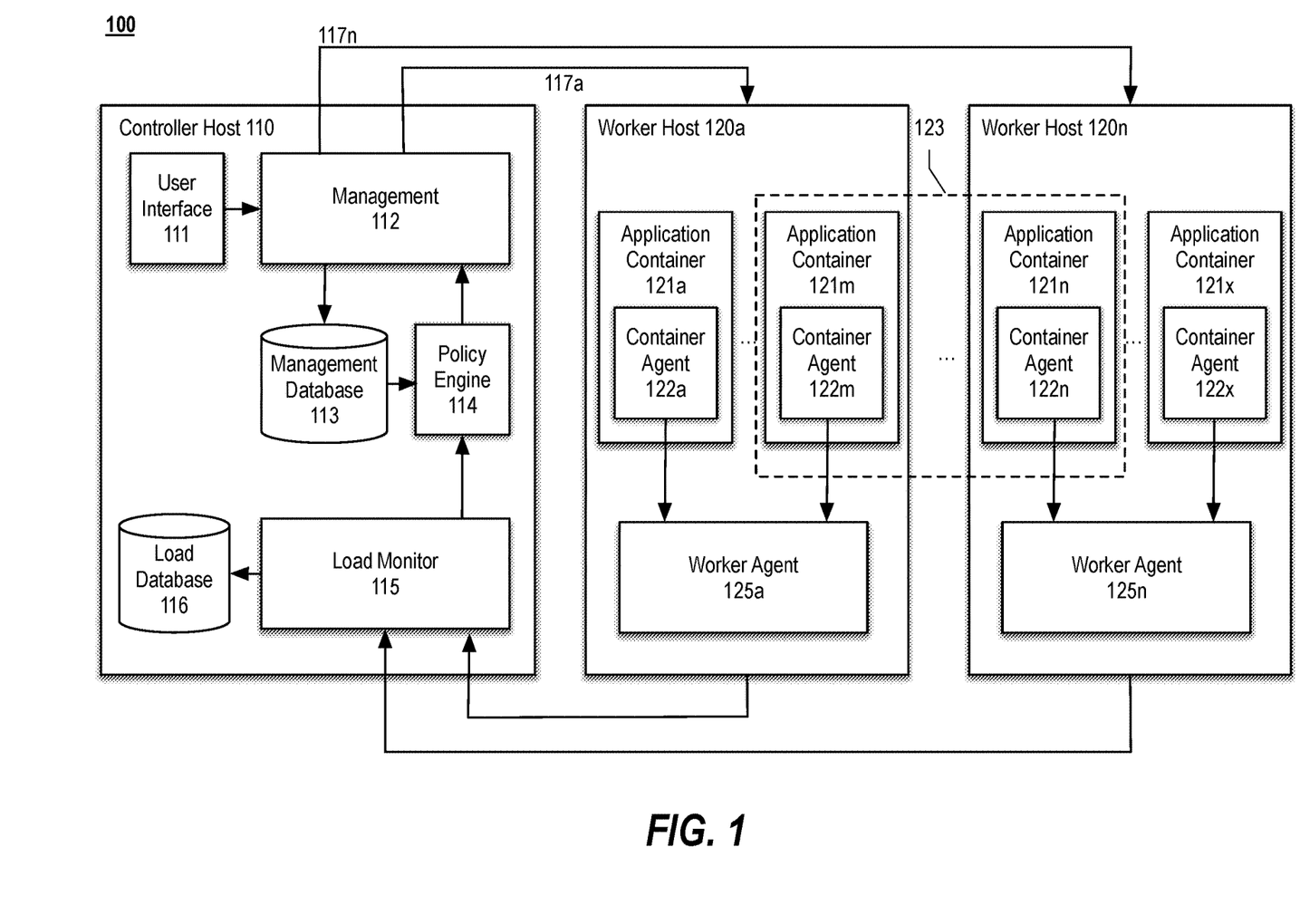
FIG. 1 is a high-level block diagram conceptually illustrating a large scale virtual data processing (LSVDP) environment in accordance with an example embodiment.

FIG. 1 is a high-level block diagram conceptually illustrating a large scale virtual data processing (LSVDP) environment 100 in accordance with an example embodiment. In the context of the present example, the LSVDP environment 100 includes a controller host 110 and a cluster of multiple worker hosts 120a-n. The hosts may represent commodity, off-the-shelf, servers. In one embodiment, the servers may be dual processor, dual core machines with 4-8 GB of RAM using error correcting code (ECC) memory. Those skilled in the art will appreciate different machine configurations may be used depending upon the particular workflow needs of the application at issue.

In the context of the present example, the controller host 110 includes a user interface 111, a management module 112, a management database 113, a policy engine 114, a load monitor 115, and a load database 116. The user interface 111 may provide an interface to the user to facilitate creating of a virtual cluster (e.g., virtual clusters 123a-n) on a worker host (e.g., worker host 12a-n) and facilitate configuration of one or more role-based autoscaling policies for each role of an application that will be deployed within a virtual cluster (e.g., virtual cluster 123). Alternatively or additionally, the role-based autoscaling policies may be provided in the form of object notation files.

In the context of the present example, each worker host 120*a-n* includes a worker agent 125*a-n* and multiple application containers 121*a-m* and 121*n-x*, which may be part of different virtual clusters. A virtual cluster (e.g., virtual cluster 123) generally includes multiple nodes/containers among which the load of a particular application is shared/balanced. The nodes/containers of a virtual cluster may be distributed on different worker hosts 120*a-n*. So, on each worker host 120*a-n*, the containers may belong to different virtual clusters, which may each correspond to one kind of application (e.g., a Hadoop cluster, a Spark cluster, etc.). The application containers 121*a-m* and 121*n-x* each include respective container agents 122*a-m* and 122*n-x* and implement their respective role of the set of roles/responsibilities of the particular application. For example, assuming virtual cluster 123 corresponds to an application having three different roles, a first subset of the application containers in the virtual cluster 123 may perform functionality associated with a first of the three roles, a second subset of the application containers may perform functionality associated with a second of the three roles, and a third subset of the application containers may perform functionality associated with a third of the three roles.

In the context of the present example, the container agents 122*a-m* and 122*n-x* may help collect load information for their respective application containers 121*a-m* and 121*n-x* and report the collected load information to the appropriate worker agent 125*a-n*.

In one embodiment, the worker agents 125*a-n* are responsible for spawning or deleting application containers 121*a-m* and 121*n-x* within their respective virtual clusters based on requests 117*a-n* issued by the management module 112.

In the present example, the application containers 121*a-m* and 121*n-x* may cooperate with each other to implement the function/service of the application associated with their respective virtual clusters For example, application container 121*m* may be associated with a first role of virtual container 123 and perform a particular task on a first portion of a big data set (not shown) while application container 121*n*, associated with a second role of. Virtual container 123, concurrently performs a different task on a second portion of the big data set. Alternatively, both application container 121*m* and 121*n* may be associated with the same role and may perform the same task on respective portions of the big data set in parallel.

Returning to the controller host 110, in the context of the present example, the management module 112 is responsible for managing the physical resources of the cluster (including worker hosts 120*a-n*) and deploying the virtual clusters (e.g., virtual cluster 123) on the worker hosts 120*a-n* based on input from the user. In one embodiment, the management module 112 also directs the worker hosts 120*a-n* to scale up/scale down containers depending upon their respective roles when the condition(s) of the corresponding role-based autoscaling policies (not shown) are met.

According to an embodiment, the management module 112 persists information associated with the worker hosts 120*a-n* and the virtual clusters within the management database 113. The information persisted may include the associated containers (e.g., application containers 121*a-*121*m* and application containers 121*n-x*) as well as their respective roles.

In the context of the present example, the load monitor 115 is responsible for collecting from the worker hosts 120*a-n* load information for all containers running on the respective worker hosts 120*a-n*. Depending upon the particular implementation, the load information may be pulled by the load monitor 115 or pushed by the worker agents 125*a-n*. For example, the load monitor 115 may periodically request load information from the worker agents 125*a-n* for all containers of their respective worker hosts 120*a-n*. Alternatively, the worker agents 125*a-n* may periodically report local load information for all containers of their respective worker hosts 120*a-n* to the load monitor 115. The load monitor 115 may persist the load information received from worker agents 125*a-n* to local or remote storage. In one embodiment, the load monitor 115 persists the collected load information to load database 116.

In the context of the present example, the policy engine 114 is responsible for retrieving the virtual cluster configuration/deployment information and the corresponding role-based autoscaling policies from the management database 113. Based on the role-based autoscaling policies, the policy engine 114 may also collect load information from the load monitor 115 for each role of the virtual cluster. In one embodiment, the role-based autoscaling policies provide information indicative of how frequently the load information for the corresponding role is to be evaluated. The policy engine 114 may also be responsible for evaluating the load information against the role-based autoscaling policies to determine whether the load associated with a particular roles meets the corresponding set of conditions defined in a role-based autoscaling policy for the particular role; and if so, informing the management module 112 to scale up/scale down the containers that belong to the particular role as well as containers that belong to any dependent roles.

The various modules, engines, agents and the like described above with reference to FIG. 1 and the processing described below with reference to the flow diagrams of FIGS. 2-4 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems of various forms, such as the computer system described with reference to FIG. 6 below.

While for sake of brevity, certain actions may be described with reference to the flow diagrams of FIGS. 2-4 as taking place in a particular order and in series, those skilled in the art will appreciate some of these actions may be performed in an alternative order than presented and/or in parallel with one or more other actions. As such, the particular order in which the blocks of the respective flow diagrams are depicted is not intended to be limiting.

Figure 2:
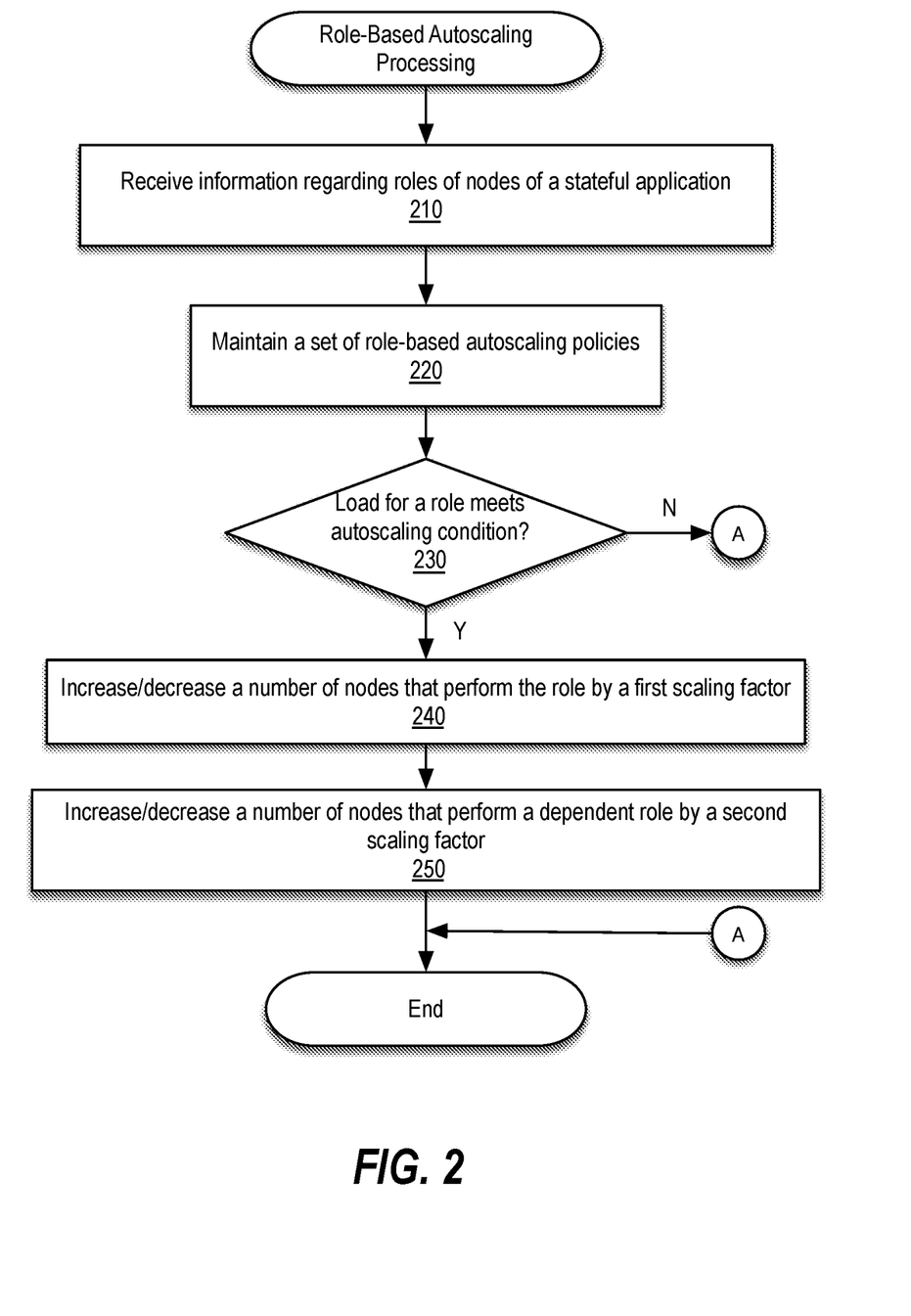
FIG. 2 is a flow diagram illustrating role-based autoscaling processing in accordance with an example embodiment.

FIG. 2 is a flow diagram illustrating role-based autoscaling processing in accordance with an example embodiment. According to one embodiment, blocks 210-230 of the role-based autoscaling processing are performed by a controller host (e.g., controller host 110) of an LSVDP environment (e.g., LSVDP environment 100) and blocks 240 and 250 are performed by a worker host (e.g., worker hosts 120*a-n*) of the LSVDP environment.

At block 210, information regarding roles of nodes of a stateful application is received. In one embodiment, role IDs may be provided by a user at the time of creation of the virtual cluster for the stateful application. For example, a configuration file associated with the stateful application or an application profile for the stateful application identifying a set of roles associated with the application may be uploaded to a management module (e.g., management module 112) via a user interface (e.g., user interface 111) of the controller host. Alternatively, the user may key in information regarding the roles via the user interface. As yet another alternative, the role set of for each stateful application may be predefined.

At block 220, a set of role-based autoscaling policies are maintained. In one embodiment, policy files can be uploaded to the management module via the user interface and the management module may persist the policy files to a management database (e.g., management database 113). The party (e.g., a customer of a service provider that allows use of the LSVDP environment) launching the stateful application can define the role-based autoscaling policies according to the load model of the application. Depending upon the particular implementation, the role-based autoscaling policies may include rule sets that define the condition(s) under which the specific role is to be scaled up and/or scaled down. Each role may include multiple rule sets and the rules for different roles may co-exist within the same policy file or be separated across multiple policy files.

As explained in further detail below with reference to FIGS. 5A-B, policies can also include cooperation and association between different roles. For example, assuming a first role is dependent upon a second role, the scale out policy for the second role can be defined in such a manner so as to cause the nodes for the first role to be automatically increased when the set of conditions for scaling out the second role are met. Similarly, the scale in policy for the second role can be defined in such a manner so as to cause the nodes for the first role to be automatically removed correspondingly when the set of conditions for scaling in the second role are met.

At decision block 230, a determination is made regarding whether the load for a role meets the set of autoscaling conditions defined for the role. In one embodiment, for each role of the virtual clusters being monitored, a policy engine (e.g., policy engine 114) periodically evaluates the defined conditions to expand/shrink the role against the corresponding load information for the role. In one embodiment, the evaluation period for each role may be configured independently via the role-based autoscaling policy for the role. When the load information for a role meet the defined conditions to expand or shrink the role, then processing continues with block 240; otherwise, processing for the particular evaluation period is complete.

At block 240, the number of nodes that perform the role is increased or decreased by a first scaling factor. For example, the management module may issue a scale up or scale down request for the role to a worker agent (e.g., worker agent 125a-n) associated with the worker host to or from which one or more nodes are to be added or removed. In one embodiment, in case of expansion, the controller host 110 may consider the load of each worker host 120a-n and select one worker host 120a-n with minimum load to deploy one or more new containers for the role. The selected worker host may or may not have previously included a container of the virtual cluster. In alternative embodiments, the controller host 110 may consider other attributes, factors or metrics associated with the worker hosts 120a-n in connection with selecting a worker host on which to deploy the new container(s).

In one embodiment, the first scaling factor (or step), which indicates the number of nodes to add or remove, can be defined independently for scaling up and scaling down within the role-based autoscaling policy for the role at issue.

According to one embodiment, as expansion does not typically have any adverse side effects, the expansion of the number of nodes performing a role can be performed more aggressively than contraction of the number of nodes performing the role. To reduce resource waste, the virtual cluster of the stateful application can be created with minimal cluster size and then automatically expanded based on the autoscaling policy. As described in further detail below with reference to FIGS. 5A-B, to adapt to aggressive expansion, the autoscaling policy may use a condition set evaluation approach (e.g., an "if_any" statement) that triggers responsive to any of multiple specified conditions being satisfied.

Shrinking, on the other hand, may be performed more conservatively as decreasing the number of nodes of a particular role too quickly can lead to job failure or trashing back and forth between expansion and contraction. For example, in the context of a Hadoop/Spark application, intermediate shuffle data may be distributed across a number of worker nodes. While some worker nodes may seem idle, those worker nodes may still be maintaining intermediate data for later processing. As such, if one of these worker nodes is removed too soon, the job manager will need to schedule another worker node to regenerate the lost shuffle data. As described in further detail below with reference to FIGS. 5A-B, to adapt to conservative contraction, the autoscaling policy may use a condition set evaluation approach (e.g., an "if_all" statement) that triggers only when all of multiple specified conditions are satisfied.

At block 250, the number of nodes that perform a dependent role is increased or decreased by a second scaling factor. For example, when the role-based policy for the role whose autoscaling conditions were determined to have been met at decision block 230, specifies a dependent role, the management module may issue a scale up or scale down request as the case may be for the dependent role to the worker agent. In one embodiment, the second scaling factor (or step) can be defined independently for scaling up and scaling down and may be specified within the autoscaling policy.

Figure 3:
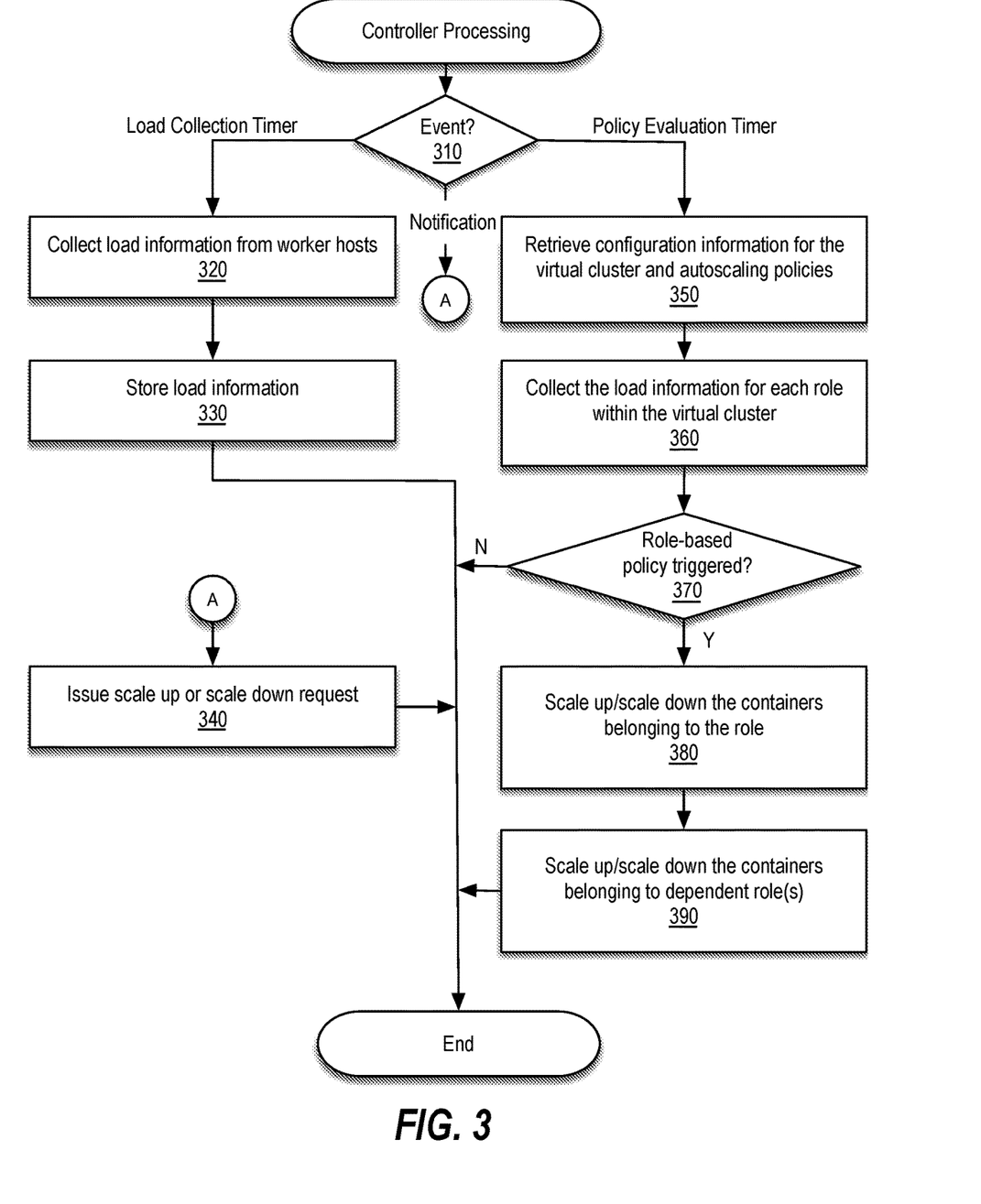
FIG. 3 is a flow diagram illustrating controller processing in accordance with an example embodiment.

FIG. 3 is a flow diagram illustrating controller processing in accordance with an example embodiment. According to one embodiment, controller processing is performed by a controller host (e.g., controller host 110) of an LSVDP environment (e.g., LSVDP environment 100). In the context of the present example, at decision block 310, the controller host evaluates an event. For example, one of a management module (e.g., management module 112), a policy engine (e.g., policy engine 114), or a load monitor (e.g., load monitor 115) may receive an event to be processed. When the event represents expiration of a load collection timer, processing continues with block 320, when the event represents a notification from the policy engine that an autoscaling policy has been triggered, processing continues with block 340, and when the event represents expiration of a policy evaluation timer, processing continues with block 350.

At block 320, the load monitor collects load information from all worker hosts (e.g., 120a-n) being monitored. For example, the load monitor may request a worker agent (e.g., worker agents 125a-n) running on each of the worker hosts to provide load information for all containers or selected containers of their respective application containers 122a-m and 122n-x. As noted above, in alternative embodiments, the worker agent may proactively push load information on a periodic basis to the load monitor.

In one embodiment, the worker agents 125*a-n* have no knowledge regarding the roles of the containers running on their respective worker hosts 120*a-n*, need not know which container belongs to which virtual cluster, and need not understand the role/responsibility of each container. As noted above, this knowledge may be maintained by the controller host, for example, within the controller host's databases (e.g., load database 116 and management database 113). In one embodiment, the controller host's databases maintain information for each virtual cluster, including a role list for each virtual cluster, the number of containers for each role, the worker host on which each container is deployed, etc. In this manner, the policy engine has access to sufficient information to understand the mapping between roles and containers for each virtual cluster to perform policy enforcement.

According to one embodiment, the load information may include multiple metrics for each role. Non-limiting examples of the metrics relate to CPU utilization, memory (e.g., RAM) utilization, network utilization and disk I/O utilization. For example, the worker agent may report that an application container associated with a first role is utilizing X % of the CPU resources available to the application container, Y % of the memory resources (e.g., resident set size (RSS)) available to the application container, and Z % of the network bandwidth available to the application container. Other metrics may be expressed in different units. For example, the worker agent may report that in addition to or in place of the above metrics, the application container associated with the first role is using network I/O bandwidth of N megabytes (MB) per second (MBps), performing disk I/O operations at a rate of M operations per second (e.g., I/O per second (IOPS)) or is using disk I/O bandwidth of P megabytes (MB) per second (MBps). Depending upon the particular implementation, the IOPS and/or bandwidth metrics may be further split into read/write or transmit/receive metrics. For example, with respect to network bandwidth, for each role, a network I/O transmit bandwidth (e.g., in MBps) and/or a network I/O receive bandwidth (e.g., in MBps) may be monitored/reported. Similarly, with respect to disk I/O metrics, for each role, one or more of disk write IOPS, disk read IOPS, disk I/O write bandwidth (e.g., in MBps), and disk I/O read bandwidth (e.g., in MBps) may be monitored/reported.

According to one embodiment, various statistics for the metrics may also be reported. For example, the load reporting may include information regarding a minimum value or a maximum value for a particular metric observed during the evaluation period. The load reporting may also include information regarding an average value and/or a mean value for the metric at issue over the evaluation period.

At block 330 the load information is stored. For example, the load monitor 115 may persist the load information to the load database 116.

At block 340, a scale up or scale down request may be issued. For example, responsive to a notification from the policy engine that a scale out or scale in policy for a particular role has been triggered, the management module may request the worker agent on the appropriate worker host to increase/decrease the number of nodes for the particular role by a step size indicated in the scaling policy. Similarly, when the triggered scale out or scale in policy identifies a dependent role to also be scaled out or scaled in, the management module may request the worker agent on the appropriate worker host to increase/decrease the number of nodes for the dependent role by a step size indicated in the scaling policy.

In one embodiment, the controller may also notify the virtual cluster what has changed. The distributed virtual cluster generally will include one "management" role, and it provides an application programming interface (API) to allow the controller to notify the management role of changes to other roles. In this manner, the "management" role of the virtual cluster may synchronize/handle the change of the number of containers for roles in the virtual cluster, for example, by updating the global configuration of the virtual cluster, etc. For some applications, there is no need to notify the "management" role/node since the newly added container/node will itself register with the "management" role/node automatically. Similarly, for some applications, there is no need to notify the "management" role/node since the newly deleted container/node will automatically be considered dead after there is no heartbeat from the deleted node for a while.

At block 350, configuration information for a virtual cluster and the associated role-based autoscaling policies are retrieved. For example, the policy engine may retrieve the configuration information and the policies from the management database 113.

At block 360, the load information for each role within the virtual cluster is collected. In one embodiment, the policy engine requests the load information for those of the roles whose respective evaluation periods (e.g., specified in the scaling policies) have expired.

At decision block 370, it is determined whether any role-based autoscaling policies have been triggered. For example, the policy engine may evaluate the load information against the conditions specified by the role-based autoscaling policies of those of the roles due for evaluation. When no policies are trigged, then controller processing is complete; otherwise when a policy is triggered, processing continues with block 380. It is to be understood that blocks 380 and 390 may be repeated for each policy that is triggered.

At block 380, the controller causes the containers belonging to the role whose scale out or scale in policy was triggered to be scaled appropriately. For example, the policy engine may provide the management module with a scaling notification including information regarding the role to be scaled (e.g., the role ID), whether the role is to be scaled up or down, and the scale step (e.g., from the policy). The controller may determine on which worker host the new containers(s) are to be deployed or the worker host from which to delete the container(s) based on one or more rules, for example, involving the load of the worker hosts and/or other factors.

In one embodiment, the policy specifies a separate action interval, defining a minimum time between performing consecutive scaling actions. In such an embodiment, the policy engine may delay the notification to the management module until after the action interval has expired. Responsive to the scaling notification, the management module may issue an appropriate scaling request to the worker agent running on the worker host identified by the scaling notification.

At block 390, if one or more dependent roles are identified by the triggered policy, then those one or more dependent roles are also caused to be scaled out or scaled in as appropriate in a manner similar to that described above with reference to block 380.

While, for sake of brevity, in the context of the present example, policy evaluation is described with reference to one virtual cluster, those skilled in the art will appreciate blocks 350-390 can be repeated for each virtual cluster being monitored. Additionally, for sake of brevity, the above example assumes the use of a single policy evaluation timer (e.g., representing a greatest common divisor of the evaluation periods represented within the role-based autoscaling policies). In alternative embodiments, there may be multiple policy evaluation timers (e.g., one for each unique evaluation period specified by the role-based autoscaling policies).

Figure 4:
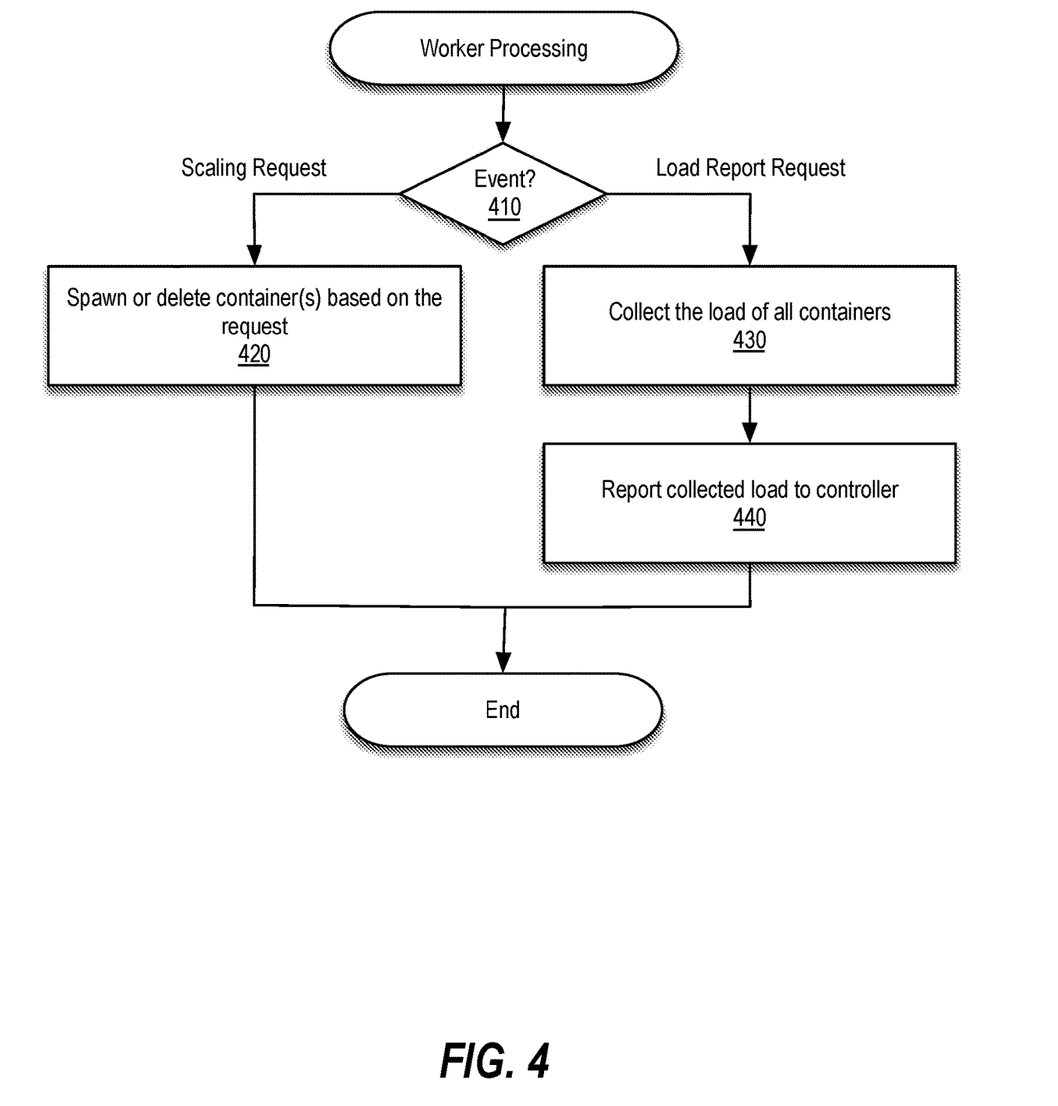
FIG. 4 is a flow diagram illustrating worker processing in accordance with an example embodiment.

FIG. 4 is a flow diagram illustrating worker processing in accordance with an example embodiment. According to one embodiment, worker processing is performed by each worker host (e.g., worker hosts 120a-n) of an LSVDP environment (e.g., LSVDP environment 100). In the context of the present example, at block 410, the worker host evaluates an event. For example, a worker agent (e.g., worker agent 125a-n) running on the worker host may receive a request from a controller host (e.g., controller host 110). When the event represents receipt of a scaling request (e.g., from a management module running on the controller host), processing continues with block 420; and when the event represents receipt of a load report request (e.g., from a load monitor running on the controller host), processing continues with block 430. As an alternative to receiving a load report request, the worker agent may periodically collect and report load information for containers (e.g., application containers 121a-m and application containers 121n-x) associated with the virtual cluster (e.g., virtual cluster 123a-n) on the worker host responsive to expiration of a load collection timer, for example.

At block 420, one or more containers are spawned or deleted based on the received scaling request. In one embodiment, the worker agent directs the worker host to spawn or delete a number (specified within the received scaling request) of containers associated with the role (which may also be specified within the received scaling request).

At block 430, load information for the containers is collected. For example, the worker agent may request the load information for all or a specified set of containers on the worker host. Non-limiting examples of load information that may be collected for each container include metrics relating to CPU utilization, memory (e.g., RAM) utilization, network bandwidth usage, and disk IOPS and throughput.

At block 440, the collected load information is reported to the controller host. For example, the worker agent may report the collected load information the load monitor.

Figure 5A:
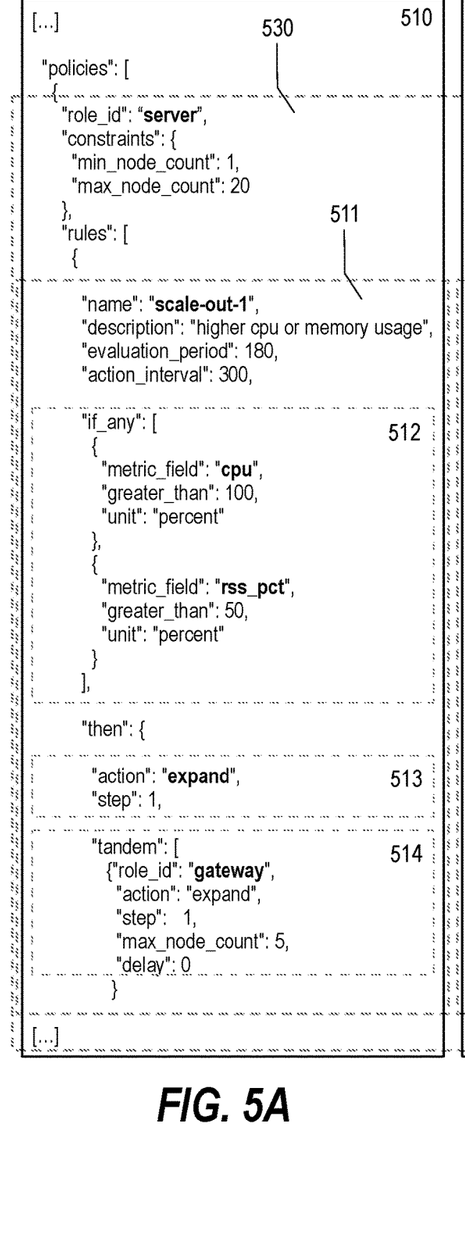
FIGS. 5A-B together depict portions of a policy file containing a role-based policy expressed in an object notation format in accordance with an example embodiment.
Figure 5B:
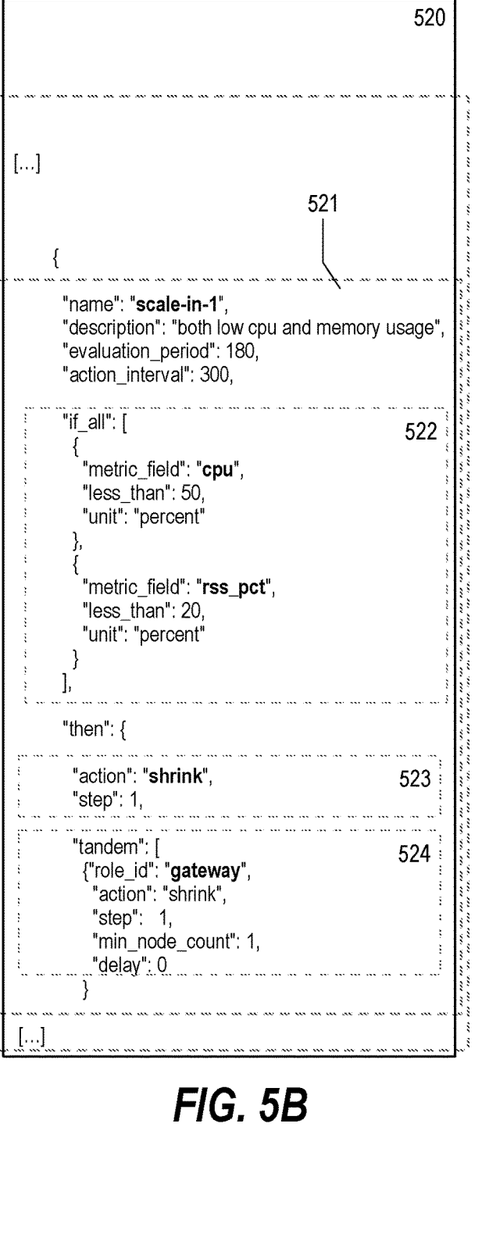

FIGS. 5A-B together depict portions 510 and 520 of a policy file 500 containing a role-based policy 530 expressed in an object notation format in accordance with an example embodiment. In the context of the present example, the role-based policy 530 is for a role ID of "server" and the minimum and maximum number of nodes for this role are 1 and 20, respectively. The role-based policy 530 includes multiple rule sets 511 and 521. Rule set 511 is named "scale-out-1" and has an evaluation period of 180 seconds and an action interval of 300 seconds. Rule set 511 includes two metrics (i.e., "cpu" and "rss_pct") that are evaluated by an "if_any" statement. As such, when either of the conditions relating to the metrics are met (i.e., when the cpu percent is greater than 100 percent or when the rss percent is greater than 50 percent), then the associated expand action 513 is triggered to cause the role of "server" to be scaled out by the number of nodes specified by the "step" associated with the expand action 513.

In this example, when the conditions relating to the metrics are met, a tandem expand action 514 is also triggered for a dependent role ID of "gateway" to cause the role of "gateway" to be scaled out by the number of nodes specified by the "step" associated with the tandem expand action 514 in tandem with (subject to a specified "delay") the "server" role ID.

Rule set 521 is named "scale-in-1" and has an evaluation period of 180 seconds and an action interval of 300 seconds. Rule set 521 includes two metrics (i.e., "cpu" and "rss_pct") that are evaluated by an "if_all" statement. As such, only when all of the conditions relating to the metrics are met (i.e., when the cpu percent is less than 50 percent and when the rss percent is less than 20 percent), then the associated shrink action 523 is triggered to cause the role of "server" to be scaled in by the number of nodes specified by the "step" associated with the shrink action 523.

In this example, when the conditions relating to the metrics are met, a tandem shrink action 524 is also triggered for a dependent role ID of "gateway" to cause the role of "gateway" to be scaled in by the number of nodes specified by the "step" associated with the tandem shrink action 524 in tandem with (subject to a specified "delay") the "server" role ID.

While in this example, the rule sets involve specific conditions relating to CPU and RSS, those skilled in the art will appreciate any combination of conditions relating to any load information may be used. Also, while in this example the policy file 500 is expressed in an object notation format (e.g., JavaScript Object Notation (JSON)), those skilled in the art will appreciate a variety of other formats may be used, including, but not limited to extensible Markup Language (XML), YAML Ain't Markup Language (YAML), and self-defined plain text).

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 6:
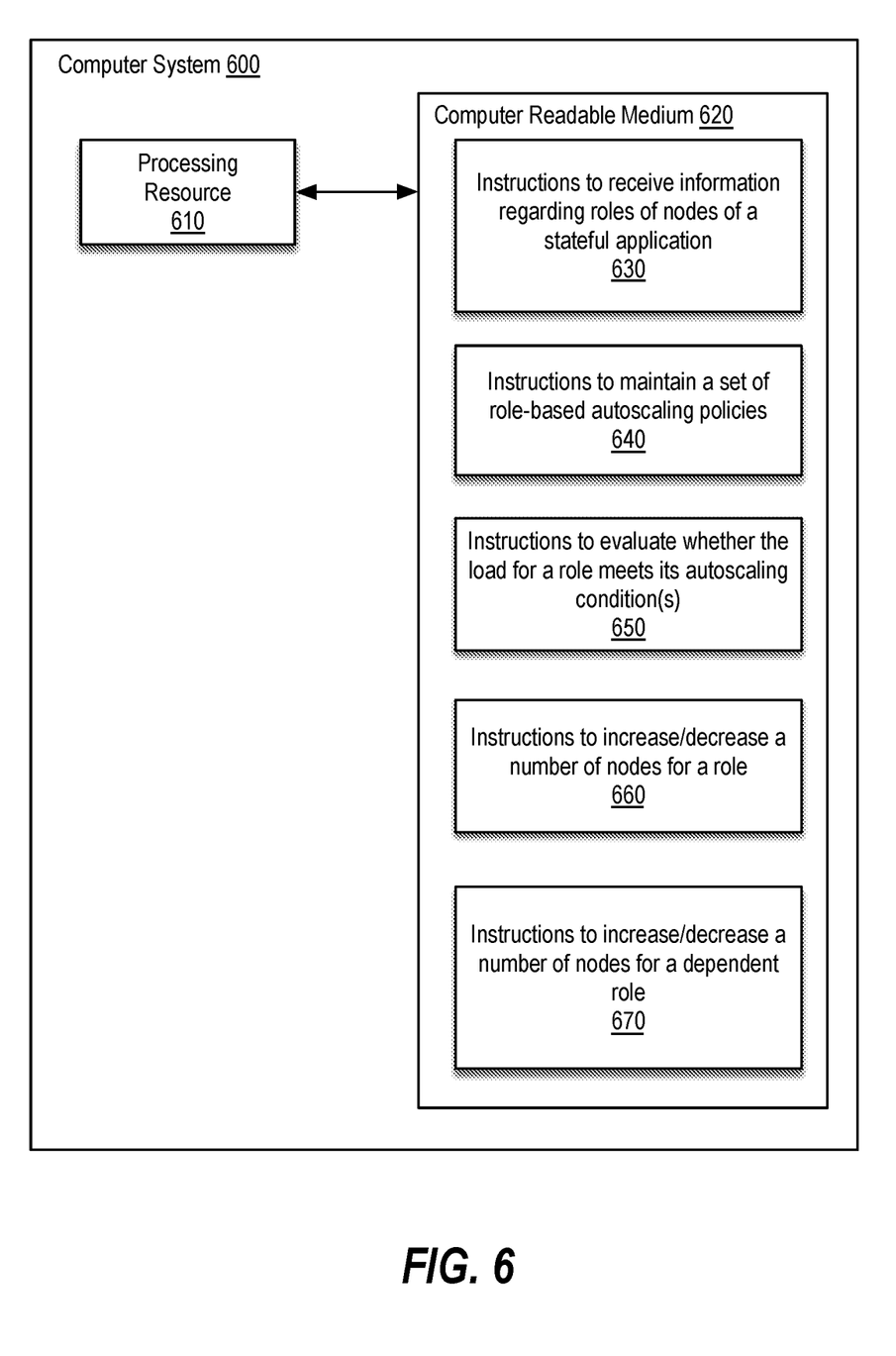
FIG. 6 is a block diagram of a computer system in accordance with an embodiment.

FIG. 6 is a block diagram of a computer system in accordance with an embodiment. In the example illustrated by FIG. 6, computer system 600 includes a processing resource 610 coupled to a non-transitory, machine readable medium 620 encoded with instructions to perform a proactive auto-scaling method in accordance with a private cloud embodiment. The processing resource 610 may include a microcontroller, a microprocessor, central processing unit core(s), an ASIC, an FPGA, and/or other hardware device suitable for retrieval and/or execution of instructions from the machine readable medium 620 to perform the functions related to various examples described herein. Additionally or alternatively, the processing resource 610 may include electronic circuitry for performing the functionality of the instructions described herein.

The machine readable medium 620 may be any medium suitable for storing executable instructions. Non-limiting examples of machine readable medium 620 include RAM, ROM, EEPROM, flash memory, a hard disk drive, an optical disc, or the like. The machine readable medium 620 may be disposed within the computer system 600, as shown in FIG. 6, in which case the executable instructions may be deemed "installed" or "embedded" on the computer system 600. Alternatively, the machine readable medium 620 may be a portable (e.g., external) storage medium, and may be part of an "installation package." The instructions stored on the machine readable medium 620 may be useful for implementing at least part of the methods described herein.

In the context of the present example, the machine readable medium 620 is encoded with a set of executable instructions 630-670. It should be understood that part or all of the executable instructions and/or electronic circuits included within one block may, in alternate implementations, be included in a different block shown in the figures or in a different block not shown.

Instructions 630, upon execution, cause the processing resource 610 to receive information regarding roles of nodes of a stateful application. In one embodiment, instructions 630 may correspond generally to instructions for performing block 210 of FIG. 2.

Instructions 640, upon execution, cause the processing resource 610 to maintain a set of role-based autoscaling policies. In one embodiment, instructions 640 may correspond generally to instructions for performing block 220 of FIG. 2.

Instructions 650, upon execution, cause the processing resource 610 to evaluate whether the load for a role meets its autoscaling condition(s). In one embodiment, instructions 650 may correspond generally to instructions for performing decision block 230 of FIG. 2.

Instructions 660, upon execution, cause the processing resource 610 to increase/decrease a number of nodes for a role. In one embodiment, instructions 660 may correspond generally to instructions for performing block 240 of FIG. 2.

Instructions 670, upon execution, cause the processing resource 610 to increase/decrease a number of nodes for a dependent role. In one embodiment, instructions 660 may correspond generally to instructions for performing block 250 of FIG. 2.

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A method comprising:
maintaining, by a controller host of a distributed processing environment:
a database comprising information of a plurality of roles of a stateful application performed by a plurality of application containers distributed across a plurality of worker hosts of the distributed processing environment, and
a role-based autoscaling policy for a first role specifying a first condition that triggers scaling out of the first role by a first scaling factor and scaling out of a second role that is dependent upon the first role by a second scaling factor in tandem, the role-based autoscaling policy further specifying an evaluation period and an action interval for the first role;
evaluating, by the controller host during the evaluation period, load information for the first role collected from container agents in first application containers of the plurality of application containers against the role-based autoscaling policy;
based on the evaluation determining that the load information for the first role meets the first condition, the controller host:
determining to increase a quantity of the first application containers that perform the first role by the first scaling factor,
identifying the second role that is dependent upon the first role based on tandem information in the role-based autoscaling policy specifying that the second role is dependent upon the first role,
determining to increase in tandem a quantity of second application containers that perform the second role that is dependent upon the first role by the second scaling factor, wherein the increased quantity of the first application containers includes a new first application container that includes a container agent to collect load information of the new first application container, and the increased quantity of the second application containers includes a new second application container that includes a container agent to collect load information of the new second application container, and
selecting, based on loads of the plurality of worker hosts, at least one worker host of the plurality of worker hosts on which to deploy the new first application container and the new second application container;
deploying, the new first application container and the new second application container on the selected at least one worker host after expiration of the action interval.

2. The method of claim 1, wherein the role-based autoscaling policy further specifies a second condition that triggers scaling in of the first role by a third scaling factor and scaling in of the second role by a fourth scaling factor in tandem, the method further comprising:
based on the load information for the first role meeting the second condition, decreasing the quantity of the first application containers that perform the first role by the third scaling factor, and decreasing the quantity of the second application containers that perform the second role by the fourth scaling factor.

3. The method of claim 1, wherein the role-based autoscaling policy includes a first role identifier that identifies the first role, and a second role identifier that identifies the second role.

4. The method of claim 3, wherein the role-based autoscaling policy comprises a tandem section including the second role identifier and tandem action information specifying the scaling out of the second role by the second scaling factor.

5. The method of claim 1, wherein the load information comprises one or more of a measure of central processing unit (CPU) usage by the first application containers, a measure of memory usage by the first application containers, a measure of disk usage by the first application containers, or a measure of network usage by the first application containers.

6. The method of claim 1, wherein the at least one worker host previously did not include any of the first application containers.

7. The method of claim 1, wherein the load information meeting the first condition comprises the load information meeting any one or more of a set of conditions that includes the first condition.

8. The method of claim 1, wherein the plurality of worker hosts include server machines.

9. A non-transitory machine readable medium comprising instructions that upon execution cause a controller host of a distributed processing environment to:
    maintain a database comprising information of a plurality of roles of a stateful application performed by a plurality of application containers distributed across a plurality of worker hosts of the distributed processing environment, the information further comprising a quantity of application containers for each role of the plurality of roles;
    receive a role-based autoscaling policy for a first role specifying a first condition that triggers scaling out of the first role by a first scaling factor and scaling out of a second role that is dependent upon the first role by a second scaling factor in tandem, the role-based autoscaling policy further specifying an evaluation period and an action interval for the first role;
    evaluate, at the controller host during the evaluation period, load information for the first role collected from container agents in first application containers of the plurality of application containers against the role-based autoscaling policy;
    in response to the evaluation determining that the load information for the first role meets the first condition:
        determine to increase a quantity of the first application containers that perform the first role by the first scaling factor, wherein the increased quantity of the first application containers is greater than a quantity of the first application containers indicated by the database,
        identify the second role that is dependent upon the first role based on tandem information in the role-based autoscaling policy specifying that the second role is dependent upon the first role,
        in tandem with increasing the quantity of the first application containers, determine to increase a quantity of second application containers that perform the second role that is dependent upon the first role by the second scaling factor, wherein the increased quantity of the first application containers includes a new first application container that includes a container agent to collect load information of the new first application container, and the increased quantity of the second application containers includes a new second application container that includes a container agent to collect load information of the new second application container, and
    select, based on loads of the plurality of worker hosts, at least one worker host of the plurality of worker hosts on which to deploy the new first application container and the new second application container; and
    cause deployment of the new first application container and the new second application container on the selected at least one worker host after expiration of the action interval.

10. The non-transitory machine readable medium of claim 9, wherein the role-based autoscaling policy further specifies a second condition that triggers scaling in of the first role by a third scaling factor and scaling in of the second role by a fourth scaling factor in tandem, and wherein the instructions upon execution cause the controller host to:
    in response to the load information for the first role meeting the second condition, cause a decrease in the quantity of the first application containers that perform the first role by the third scaling factor, and cause a decrease in the quantity of the second application containers that perform the second role by the fourth scaling factor.

11. The non-transitory machine readable medium of claim 9, wherein the role-based autoscaling policy includes a first role identifier that identifies the first role, and a second role identifier that identifies the second role.

12. The non-transitory machine readable medium of claim 11, wherein the role-based autoscaling policy comprises a tandem section including the second role identifier and tandem action information specifying the scaling out of the second role by the second scaling factor.

13. The non-transitory machine readable medium of claim 9, wherein the load information comprises one or more of a measure of central processing unit (CPU) usage by the first application containers, a measure of memory usage by the first application containers, a measure of disk usage by the first application containers, or a measure of network usage by the first application containers.

14. The non-transitory machine readable medium of claim 9, wherein the at least one worker host previously did not include any of the first application containers.

15. A system comprising:
    a controller host comprising:
    a processor; and
    a non-transitory computer-readable medium storing instructions executable on the processor to: maintain a database comprising information of a plurality of roles of a stateful application performed by a plurality of application containers distributed across a plurality of worker hosts of a distributed processing environment;
    receive a role-based autoscaling policy for a first role specifying a first condition that triggers scaling out of the first role by a first scaling factor and scaling out of a second role that is dependent upon the first role by a second scaling factor in tandem, the role-based autoscaling policy further specifying an evaluation period and an action interval for the first role;
    evaluate, during the evaluation period, load information for the first role collected from container agents in first application containers of the plurality of application containers against the role-based autoscaling policy;
    based on the evaluation determining that the load information for the first role meets the first condition:

determine to increase a quantity of the first application containers that perform the first role by the first scaling factor, identify the second role that is dependent upon the first role based on tandem information in the role-based autoscaling policy specifying that the second role is dependent upon the first role, in tandem with increasing the quantity of the first application containers, determine to increase a quantity of second application containers that perform the second role that is dependent upon the first role by the second scaling factor, wherein the increased quantity of the first application containers includes a new first application container that includes a container agent to collect load information of the new first application container, and the increased quantity of the second application containers includes a new second application container that includes a container agent to collect load information of the new second application container, and select, based on loads of the plurality of worker hosts, at least one worker host of the plurality of worker hosts on which to deploy the new first application container and the new second application container; and cause deployment of the new first application container and the new second application container on the selected at least one worker host after expiration of the action interval.

16. The system of claim 15, wherein the role-based autoscaling policy further specifies a second condition that triggers scaling in of the first role by a third scaling factor and scaling in of the second role by a fourth scaling factor in tandem, and wherein the instructions are executable on the processor to:

in response to the load information for the first role meeting the second condition, cause a decrease in the quantity of the first application containers that perform the first role by the third scaling factor, and cause a decrease in the quantity of the second application containers that perform the second role by the fourth scaling factor.

17. The system of claim 15, wherein the role-based autoscaling policy includes a first role identifier that identifies the first role, and a second role identifier that identifies the second role.

18. The system of claim 17, wherein the role-based autoscaling policy comprises a tandem section including the second role identifier and tandem action information specifying the scaling out of the second role by the second scaling factor.

19. The system of claim 15, wherein the load information comprises one or more of a measure of central processing unit (CPU) usage by the first application containers, a measure of memory usage by the first application containers, a measure of disk usage by the first application containers, or a measure of network usage by the first application containers.

* * * * *